US 8,028,970 B2

(12) United States Patent
Fukano et al.

(10) Patent No.: US 8,028,970 B2
(45) Date of Patent: Oct. 4, 2011

(54) SOLENOID VALVE

(75) Inventors: Yoshihiro Fukano, Moriya (JP);
Masami Yoshida, Ryugasaki (JP);
Hideaki Yashiro, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 578 days.

(21) Appl. No.: 12/127,304

(22) Filed: May 27, 2008

(65) Prior Publication Data
US 2008/0308758 A1 Dec. 18, 2008

(30) Foreign Application Priority Data

Jun. 13, 2007 (JP) ................................. 2007-156107

(51) Int. Cl.
*F16K 31/02* (2006.01)
(52) U.S. Cl. .................................................. 251/129.15
(58) Field of Classification Search ............. 251/129.15, 251/129.01; 335/261, 262, 263, 270
See application file for complete search history.

(56) References Cited

U.S. PATENT DOCUMENTS

| 3,510,814 | A | | 5/1970 | Nordfors | |
| 4,563,133 | A | * | 1/1986 | Yasuhara | 417/295 |
| 4,967,786 | A | * | 11/1990 | DuHack | 137/329.04 |
| 5,326,070 | A | * | 7/1994 | Baron | 251/129.15 |
| 6,778,049 | B1 | | 8/2004 | Alyanak | |
| 6,854,706 | B2 | | 2/2005 | Sato et al. | |
| 7,204,473 | B2 | | 4/2007 | Yoshimura et al. | |
| 2004/0232372 | A1 | * | 11/2004 | McCombs et al. | 251/129.15 |

FOREIGN PATENT DOCUMENTS

| DE | 10 2005 055 781 A1 | 6/2006 |
| DE | 602 12 017 T2 | 11/2006 |
| JP | 47-43252 | 11/1972 |
| JP | 61-131576 | 8/1986 |
| JP | 62-106077 | 7/1987 |
| JP | 63-281812 | 11/1988 |
| JP | 2-50579 | 4/1990 |
| JP | 5-52461 | 7/1993 |
| JP | 6-147344 | 5/1994 |
| JP | 10-89528 | 4/1998 |
| JP | 2955511 | 7/1999 |
| JP | 2001-74159 | 3/2001 |
| JP | 2001-146941 | 5/2001 |
| JP | 2005-325920 | 11/2005 |

* cited by examiner

*Primary Examiner* — John Fristoe, Jr.
*Assistant Examiner* — Marina Tietjen
(74) *Attorney, Agent, or Firm* — Oblon, Spivak, McClelland, Maier & Neustadt, L.L.P.

(57) ABSTRACT

A movable iron core unit includes a movable iron core, which is attracted toward a fixed iron core under excitation of a coil, and a guide member made from a resin material and mounted on an outer circumferential side of the movable iron core. The guide member is constructed from a pair of ring members and connecting members that interconnect the ring members. The ring members and the connecting members are mounted in mounting grooves, which are formed on an outer circumferential surface of the movable iron core, and project only slightly from the outer circumferential surface.

8 Claims, 4 Drawing Sheets

SOLENOID VALVE

BACKGROUND OF THE INVENTION

1. Field of the Invention

The present invention relates to a solenoid valve having a movable iron core, which is displaceable under excitation of a solenoid, and in which a communication state of fluid passages are switched by displacement of the movable iron core.

2. Description of the Related Art

Conventionally, solenoid valves have been used, for example, for supplying a pressure fluid to an actuator, or for controlling a flow direction of compressed air by exhausting the pressurized air to the atmosphere. The present inventors have proposed a solenoid valve (see Japanese Laid-Open Patent Publication No. 10-089528), which is capable of causing displacement of a valve body under excitation of a solenoid, for thereby switching a flow state of a fluid.

Such a solenoid valve is constituted by a valve part and a solenoid. The solenoid is equipped with a bobbin around which an excitation coil is wound, a magnetic frame and a mold surrounding the bobbin, a fixed iron core arranged in a central hole of the bobbin, and a movable iron core that slides inside of the central hole of the bobbin, with a valve plug being disposed on an end of the movable iron core. Further, plural guide rings are disposed on an outer circumferential surface of the movable iron core, the movable iron core being guided in the axial direction by the guide rings. In addition, a cushion member is disposed on the movable iron core for regulating displacement of the movable iron core.

SUMMARY OF THE INVENTION

A general object of the present invention is to provide a solenoid valve for which ease of assembly and reliability of the solenoid valve are improved, and which also is capable of reducing manufacturing costs.

The present invention is characterized by a solenoid valve capable of switching a communication state of fluid passages formed in a valve body by attracting a movable iron core under excitation of a solenoid, comprising a cylindrical body disposed on the movable iron core, the cylindrical body having a guide member disposed on an outer circumferential surface of the movable iron core for guiding the movable iron core along an axial direction, and a stopper that regulates displacement of the movable iron core along the axial direction, wherein the guide member and the stopper are formed integrally from a resin material.

In accordance with the present invention, the cylindrical body, which is equipped with the guide member for guiding the movable iron core along the axial direction and the stopper that regulates displacement of the movable iron core along the axial direction, is mounted with respect to the movable iron core, and in addition, the guide member and the stopper are formed integrally from a resin material. Accordingly, by integrally forming the guide member and the stopper, which conventionally have been constructed separately, and mounting them in such an integrated manner with respect to the movable iron core, the number of constituent parts can be reduced together with reducing manufacturing costs, and moreover, ease of assembly thereof with respect to the movable iron core can be improved.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
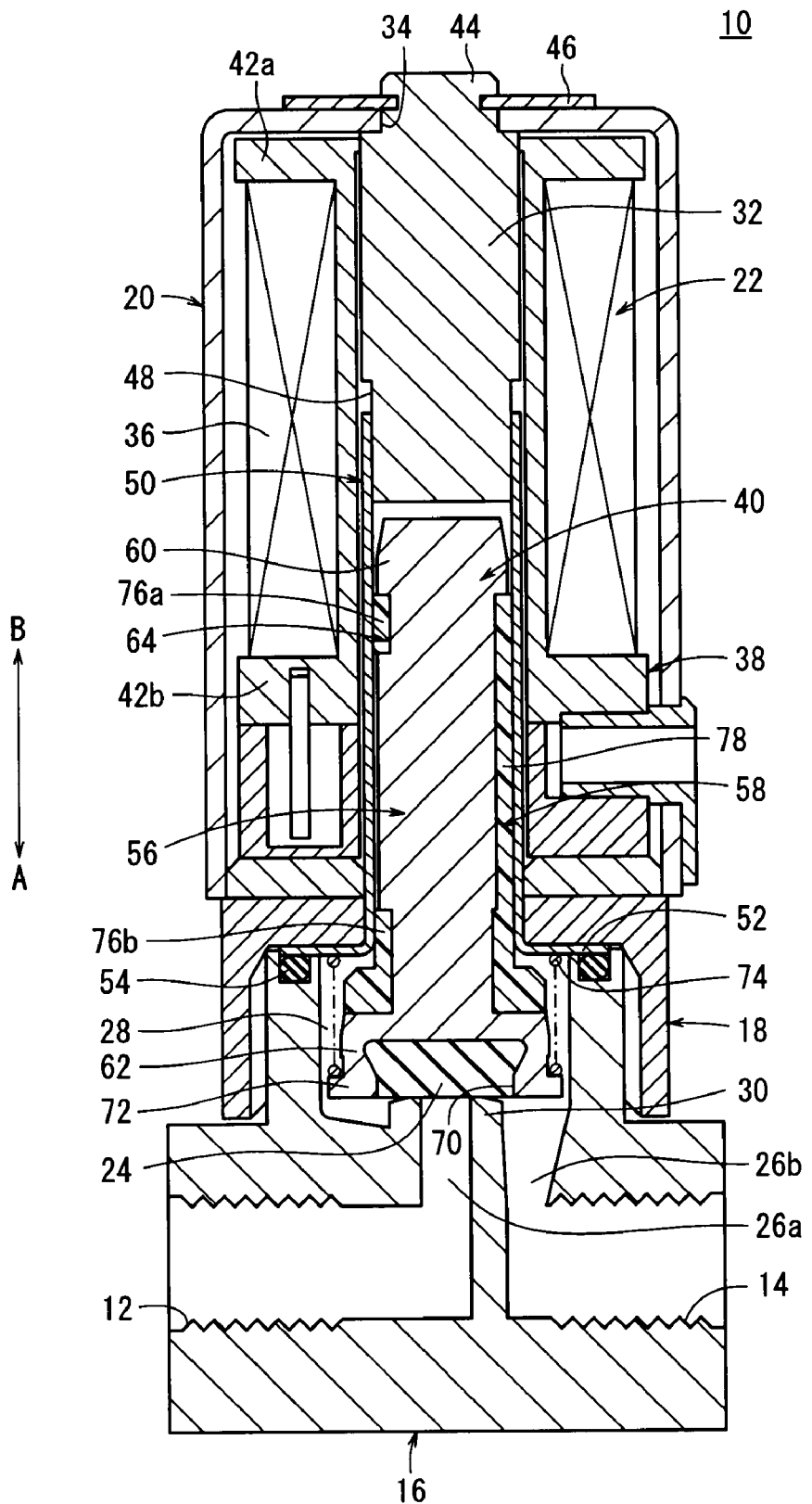
FIG. 1 is an overall vertical cross sectional view of a solenoid valve according to an embodiment of the present invention.
Figure 2:
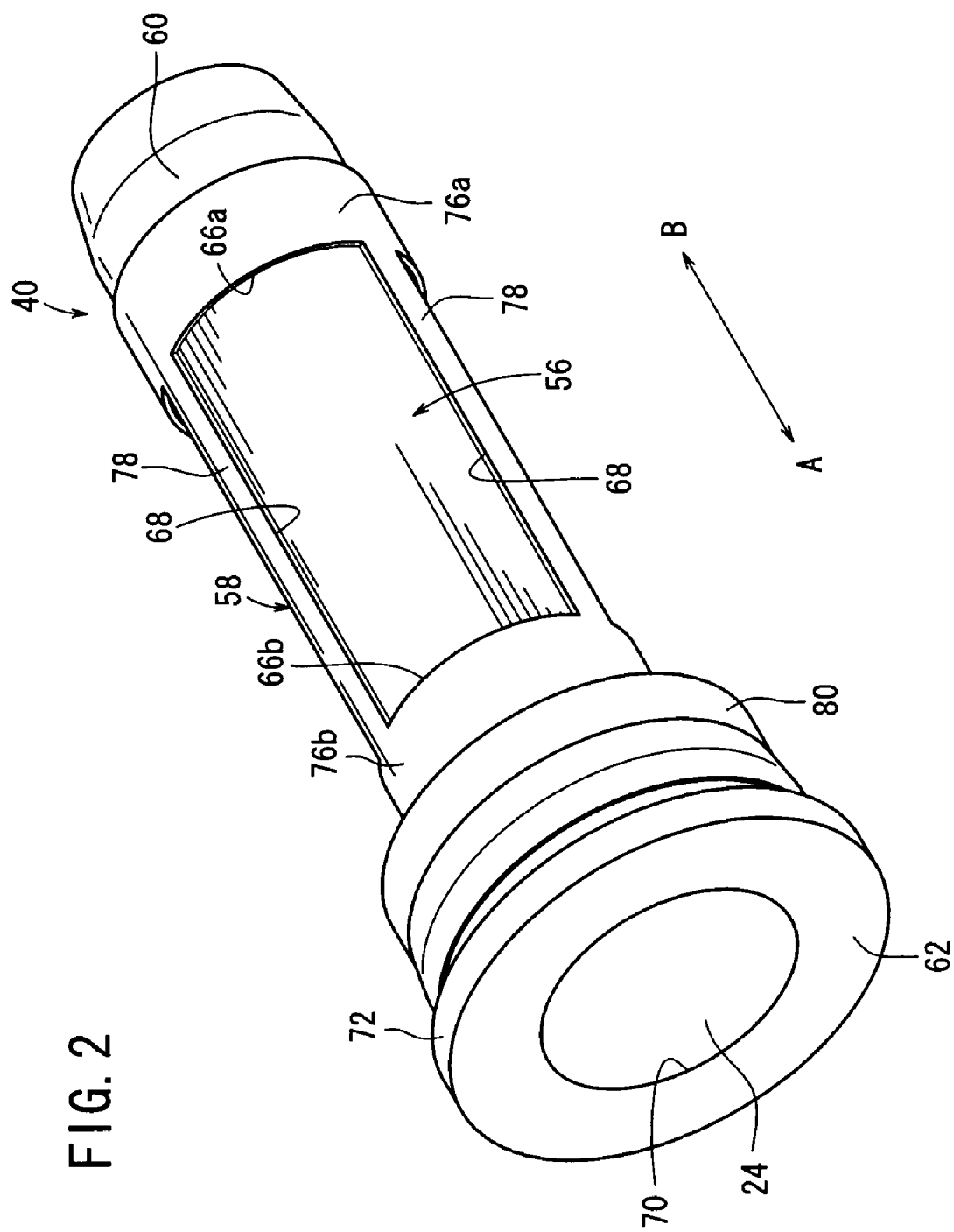
FIG. 2 is an exterior perspective view of a movable iron core unit that constitutes part of the solenoid valve of FIG. 1.
Figure 3:
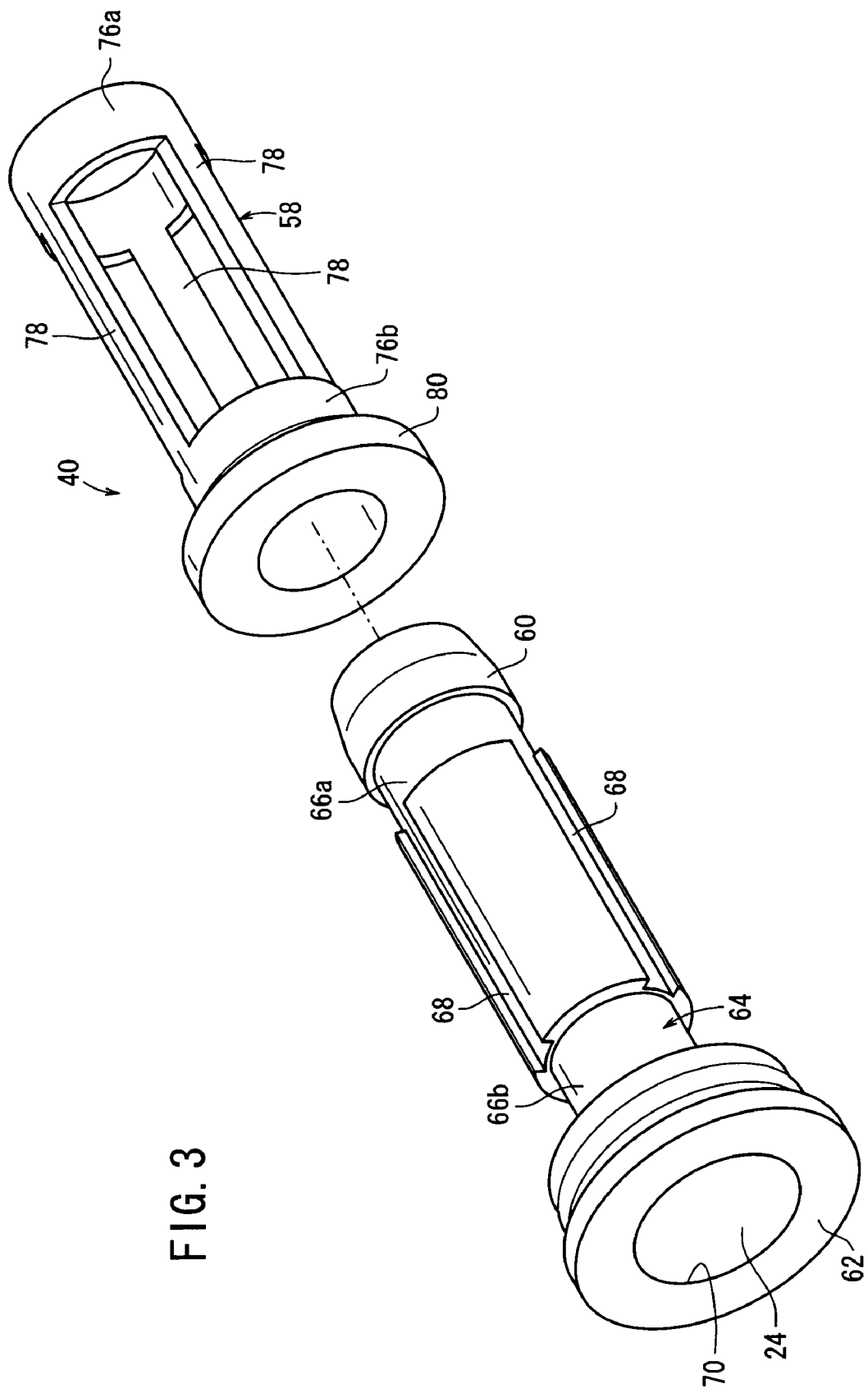
FIG. 3 is an exploded perspective view of the movable iron core unit shown in FIG. 2.
Figure 4:
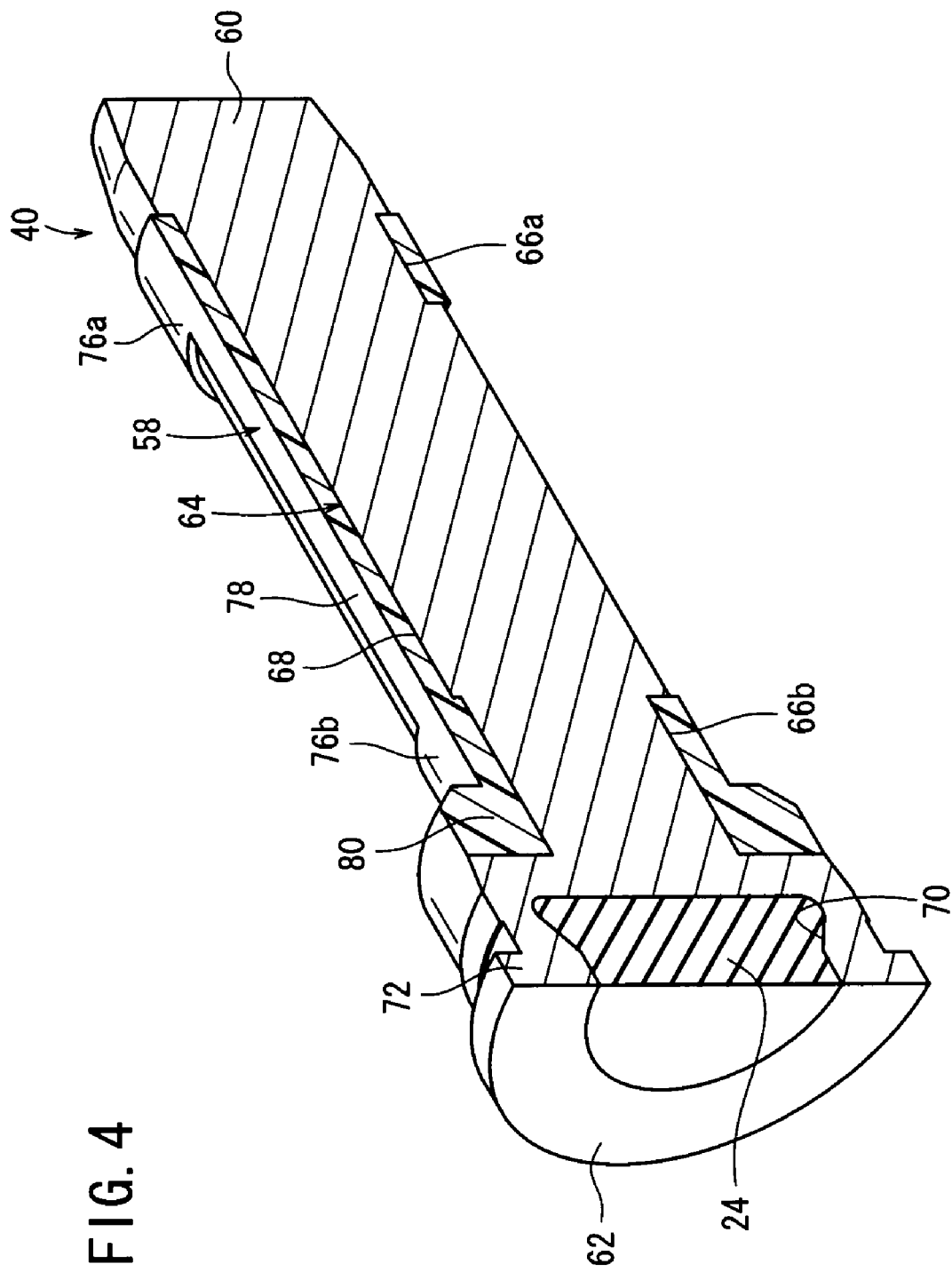
FIG. 4 is a cross sectional perspective view of the movable iron core unit shown in FIG. 2.

The solenoid valve 10, as shown in FIG. 1, includes a valve body 16 having first and second ports 12, 14 therein for supplying and discharging a pressure fluid, a solenoid 22 disposed at an upper portion of the valve body through a connecting body 18 and accommodated inside of a casing 20, and a valve plug (valve member) 24 capable of mutually switching the communication states between the first and second ports 12, 14 under excitation of the solenoid 22.

The first port 12 is disposed opening toward the exterior on one side surface of the valve body 16. A pressure fluid is supplied to the first port 12 by connecting a non-illustrated pressure fluid supply source thereto through piping or the like.

On the other hand, the second port 14 is disposed on the other side surface of the valve body and serves to discharge the pressure fluid supplied by the first port to the outside.

Further, communication passages 26*a*, 26*b* that communicate respectively with the first and second ports 12, 14 are formed in a substantially central region of the valve body 16. A communication chamber 28 disposed in an upper portion of the valve body 16 and the first and second ports 12, 14 communicate with one another through the communication passages 26*a*, 26*b*. A valve seat 30 facing the communication passage 26*a* that communicates with the first port 12 is disposed in a lower portion of the communication chamber 28. The valve plug 24 is situated for abutment against the valve seat 30.

The casing 20, for example, is formed in a bottomed cylindrical shape from a metallic material, and is installed so as to cover the solenoid 22 from an upper region thereof. A hole 34, into which the fixed iron core 32 that constitutes the solenoid 22 is inserted, is formed in an upper central portion of the casing 20.

The solenoid 22 is made up from a bobbin 38, which is arranged inside of the casing 20 and around which a coil 36 is wound, the fixed iron core 32 that is retained with respect to the casing 20, and a movable iron core unit 40, which is arranged inside of the bobbin 38 and is urged in a direction (the direction of the arrow A) to separate away from the fixed iron core 32.

The bobbin 38 is equipped with a pair of flanges 42*a*, 42*b*, which expand in a radial direction outwardly from the top and bottom ends of the bobbin 38. Between the flanges 42*a*, 42*b*, a coil 36 is wound and retained.

The fixed iron core 32 is formed in a substantially cylindrical column shape from a metal material and is inserted into and through the bobbin 38. In addition, the upper end of the fixed iron core 32 is formed with a projection 44 thereon, which is somewhat reduced in diameter radially inward. The projection 44, after being inserted through the hole 34 of the casing 20, is engaged by a retaining plate 46. As a result, the fixed iron core 32 is fixed with respect to the upper portion of the casing 20. On the other hand, a recess 48 is formed at the lower end of the fixed iron core 32, which is slightly reduced in diameter radially inward, and recessed into the outer circumferential surface of the fixed iron core 32. A portion of a sleeve 50, which is disposed inside the bobbin 38, engages with the recess 48.

The sleeve 50 is formed in a cylindrical shape having a flange 52. One end side of the sleeve 50, which is substantially constant in diameter, is arranged on the side of the fixed iron core 32 (in the direction of the arrow B), with a portion thereof engaging with the recess 48 of the fixed iron core 32, whereas the other end thereof abuts against and is retained on the end of the valve body 16 through the flange 52, which is expanded in diameter radially outward.

Due to the fact that a sealing member 54 is disposed, through an annular groove, on the end of the valve body 16, a fluidtight condition is maintained between the valve body 16 and the sleeve 50 by abutment of the flange 52 of the sleeve 50.

Further, the end of the valve body 16 and the flange 52 of the sleeve 50 are arranged inside of the connecting body 18, and by being covered by the connecting body 18, the valve body 16 and the flange 52 of the sleeve 50 are fixed together integrally.

As shown in FIGS. 1 to 4, the movable iron core unit 40 includes a movable iron core 56, which is disposed on the same axis with the fixed iron core 32, and a guide member 58 mounted on an outer circumferential surface of the movable iron core 56.

The movable iron core 56 is formed from a magnetic material, for example, and further comprises a shaft portion 60 arranged inside the sleeve 50, and a retaining section 62 formed on an end of the shaft portion 60, which is expanded in diameter radially outward with respect to the shaft portion 60.

The shaft portion 60 is formed in a cylindrical column shape having a substantially constant diameter. On one end thereof, a tapered shape is formed that gradually reduces in diameter, whereas on the other end of the shaft portion 60, the retaining section 62 is joined integrally. Further, on the outer circumferential surface of the shaft portion 60, mounting grooves 64 (see FIG. 3) are provided to facilitate mounting of the guide member 58. The mounting grooves 64 are made up from a pair of annular grooves 66a, 66b formed with annular shapes, and a plurality (e.g., three) connecting grooves 68, which interconnect both of the annular grooves 66a, 66b. The mounting grooves 64, including the annular grooves 66a, 66b and the connecting grooves 68, are recessed at a predetermined depth into the outer circumferential surface of the shaft portion 60.

The pair of annular grooves 66a, 66b are formed respectively on the one end and the other end sides of the shaft portion 60 while being separated mutually by a predetermined distance. The annular groove 66b on the other end side is formed with a somewhat wider shape than the annular groove 66a.

The connecting grooves 68 are arranged substantially in parallel along the axial direction (the direction of arrows A and B) of the shaft portion 60, and are disposed at an equal angular distance from each other along the circumferential direction of the shaft portion 60. In addition, at one end thereof, the connecting grooves 68 are connected perpendicularly to one of the annular grooves 66a formed at the one end side of the shaft portion 60, whereas, at the other end thereof, the connecting grooves 68 are connected perpendicularly to the other annular groove 66b formed at the other end side of the shaft portion 60. In other words, the mounting grooves 64 form a ladder-like shape, made up from the pair of annular grooves 66a, 66b and the connecting grooves 68.

The retaining section 62 is formed in the shape of a disk and is arranged facing the valve seat 30 of the valve body 16 (see FIG. 1). An accommodating hole (recessed portion) 70 for accommodating the valve plug 24 therein is formed on an end surface of the retaining section 62 facing the valve seat 30. The accommodating hole 70 opens with a substantially circular shape in cross section and is formed at a given depth from the end surface of the retaining section 62 toward the side of the shaft portion 60. In addition, the inner wall surface of the accommodating hole 70 on the side of the shaft portion 60 (in the direction of the arrow B) is formed in a tapered shape, which gradually expands in diameter toward the side of the shaft portion 60.

Further, an annular spring receiving portion 72, which is expanded in diameter radially outward, is provided on the outer circumferential surface of the retaining section 62. A spring 74 is installed, interposed between the spring receiving portion 72 and the flange 52 of the sleeve 50. The elastic force of the spring 74 urges the movable iron core 56 together with the retaining section 62 toward the valve seat 30 (in the direction of the arrow A). More specifically, the movable iron core 56 is normally pressed (i.e., biased) toward the side of the valve seat 30 by an elastic force of the spring 74.

The guide member 58 is formed in a cylindrical shape from a resin material, for example, and includes a pair of ring members 76a, 76b formed in annular shapes respectively, and a plurality of connecting members 78 that interconnect both ring members 76a, 76b. One of the ring members 76a, 76b includes a stopper 80 connected adjacent thereto.

The pair of ring members 76a, 76b is formed with a given thickness and a predetermined width along the axial direction. The ring members 76a, 76b are mounted respectively in the annular grooves 66a, 66b of the shaft portion 60 making up the movable iron core 56. The thickness of the ring members 76a, 76b is set so that the ring members 76a, 76b will project just slightly from the outer circumferential surface of the shaft portion 60 when installed in the annular grooves 66a, 66b. Stated otherwise, the thickness of the ring members 76a, 76b is set to be slightly greater than the depth of the annular grooves 66a, 66b.

The connecting members 78 are disposed so as to connect the pair of ring members 76a, 76b, the connecting members 78 being disposed as a plurality (e.g., three) at an equal angular distance from each other along the circumferential direction of the ring members 76a, 76b. More specifically, the connecting members 78 are connected substantially perpendicular with respect to the ring members 76a, 76b.

The connecting members 78 are installed respectively into the connecting grooves 68 of the shaft portion 60 that makes up the movable iron core 56. That is, the connecting members 78 are formed with a length dimension that corresponds with the length dimension of the connecting grooves 68.

Further, the thickness of the connecting members 78 is set such that the connecting members 78 project just slightly from the outer circumferential surface of the shaft portion 60 when installed in the connecting grooves 68. That is, the thickness of the connecting members 78 is set slightly larger than the depth of the connecting grooves 68.

The stopper 80 is disposed adjacent to and in contact with the ring member 76b arranged on the other end side of the shaft portion 60, so that the end portion abuts against an upper surface of the retaining section 62 making up the movable iron core 56. Stated otherwise, the stopper 80 is formed so as to project radially outward more than the ring member 76b, so that the outer peripheral diameter thereof is set roughly the same as the outer peripheral diameter of the retaining section 62. In addition, similar to the ring member 76b, the stopper 80 is installed in the annular groove 66b at the other end side of the shaft portion 60.

More specifically, in the mounting grooves 64 of the movable iron core 56, the ring members 76a, 76b and stopper 80 of the guide member 58 are installed in the pair of annular grooves 66a, 66b, whereas the connecting members 78 are installed respectively into the plural connecting grooves 68. In addition, when installed, the ring members 76a, 76b and the connecting members 78 project slightly with respect to the outer circumferential surface of the shaft portion 60 that makes up the movable iron core 56.

The valve plug 24 is formed from an elastic material, for example, rubber or the like, and is installed in the accommodating hole 70 of the retaining section 62 that makes up the movable iron core 56. The valve plug 24 is accommodated in the accommodating hole 70 so as to be substantially coplanar with the end surface of the retaining section 62, and is disposed so as to be seatable on the valve seat 30 of the valve body 16 upon displacement of the movable iron core 56.

Concerning formation of the valve plug 24, the elastic material made of rubber or the like is placed in a flowable or fluidized state by subjecting the material to a high temperature condition, so that the material flows into and fills the interior of the accommodating hole 70, and then the elastic material is cooled and hardened inside the accommodating hole 70. As a result, the valve plug 24 can be mounted integrally with respect to the retaining section 62. Together therewith, by engagement of the valve plug 24 in the accommodating hole 70, which is formed so as to expand in diameter toward the side of the shaft portion 60 (in the direction of the arrow B), movement outside of the accommodating hole 70 and detachment of the valve plug 24 are prevented.

The solenoid valve 10 according to the embodiment of the present invention is constructed basically as described above. Next, a manufacturing method for the movable iron core unit 40, which constitutes part of the solenoid valve 10, shall be explained.

First, the guide member 58 is assembled onto the movable iron core 56 having the shaft portion 60 and the retaining section 62. In this case, the guide member 58 is inserted from the one end side of the shaft portion 60 that is formed in a tapered shape, and the guide member 58 is displaced toward the side of the retaining section 62 (in the direction of the arrow A). Note that the guide member 58 is inserted over the shaft portion 60 from the one end side thereof having the stopper 80.

In addition, the stopper 80 and the adjacently connected ring member 76b are inserted into the annular groove 66b of the shaft portion 60 on the side of the retaining section 62, whereas the remaining ring member 76a is inserted into the annular groove 66a formed at the one end side of the shaft portion 60. Further, at the same time, the connecting members 78 of the guide member 58 are inserted respectively into the connecting grooves 68 of the shaft portion 60. Owing thereto, the guide member 58 is securely positioned via the mounting grooves 64 with respect to the shaft portion 60 of the movable iron core 56. Also, the ring members 76a, 76b and the connecting members 78 that constitute the guide member 58 are placed in a state whereby they project radially outward slightly with respect to the outer circumferential surface of the shaft portion 60.

Next, the valve plug 24 is attached with respect to the retaining section 62 of the movable iron core 56. In this case, while the elastic material made of rubber or the like is placed in a flowable or fluidized state by subjecting the material to a high temperature condition, the material flows into and fills the accommodating hole 70 of the retaining section 62. Then, following the filling operation, the elastic material is cooled and hardened, thereby forming the valve plug 24.

In this manner, the guide member 58, which is formed integrally by the ring members 76a, 76b, the connecting members 78, and the stopper 80, is inserted over the shaft portion 60 of the movable iron core 56, and by engagement thereof within the mounting grooves 64 of the shaft portion 60, the guide member 58 can be easily assembled with respect to the movable iron core 56. Further, the valve plug 24 can be easily installed by filling, thereby mounting the valve plug 24 with respect to the retaining section 62 of the movable iron core 56.

Next, operations and effects of the solenoid valve 10, into which the movable iron core unit 40 has been assembled, shall briefly be explained. FIG. 1 illustrates an OFF state, in which current is not supplied to the coil 36 and the coil 36 is non-excited, the movable iron core 56 is displaced toward the side of the valve seat 30 (in the direction of the arrow A) by an elastic force of the spring 74, the valve plug 24 is seated on the valve seat 30, and communication between the first port 12 and the second port 14 is interrupted.

In such an OFF state, by activating a non-illustrated electrical power source and energizing the coil 36, the coil 36 is excited and, under the excitation thereof, the movable iron core unit 40, including the movable iron core 56 therein, is attracted toward the side of the fixed iron core 32 (in the direction of the arrow B). At this time, while the ring members 76a, 76b and connecting members 78 of the guide member 58, which project from the outer circumferential surface of the movable iron core 56, move in sliding contact along the inner circumferential surface of the sleeve 50, the movable iron core 56 is displaced while being guided appropriately along the axial direction (the direction of the arrow B).

Further, the stopper 80 arranged on the upper portion of the retaining section 62 abuts against the flange 52 of the sleeve 50, whereby displacement of the movable iron core 56 is regulated. At this time, because the guide member 58 including the stopper 80 is formed from a resin material, shocks are absorbed and buffered appropriately upon abutment of the stopper 80 against the sleeve 50.

Owing thereto, an ON state can be switched to, in which the valve plug 24 is separated by a predetermined distance with respect to the valve seat 30, and the first port 12 and the second port 14 are brought into communication with each other through the communication passages 26a, 26b and the communication chamber 28. As a result, the pressure fluid supplied from the first port 12 passes through the gap between the valve seat 30 and the valve plug 24 and may be supplied to an unillustrated fluid-operated device via the second port 14.

In the foregoing manner, with the present embodiment, because on the movable iron core 56, the shaft portion 60 arranged inside of the sleeve 50 and the retaining section 62 having the valve plug 24 capable of being seated on the valve seat 30 are formed together in an integrated fashion, compared to a conventional solenoid valve structure in which the shaft and valve portions are each formed separately and then connected by screws or the like, the number of assembly steps can be reduced, and the occurrence of troubles caused by loosening of the screws can be prevented. Owing thereto, the reliability of the solenoid valve 10 including the movable iron core 56 can be improved.

Further, because the number of parts from which the movable iron core 56 is constructed can be reduced, the manufacturing costs for the solenoid valve 10 can also be reduced.

Further, the guide member 58, which conventionally had been made up of plural constituent elements, is formed by integral molding, and by mounting the guide member 58 with respect to the shaft portion 60 of the movable iron core 56, the number of constituent parts can be reduced together with reducing manufacturing costs. Moreover, ease of assembly of the guide member 58 with respect to the movable iron core 56 can be improved, so that the working efficiency in performing assembly of the solenoid valve can be enhanced.

Still further, because the valve plug 24 is mounted by filling an elastic material into the retaining section 62 constituting part of the movable iron core 56, compared to a case in which the valve plug is assembled onto the retaining section 62 each time, the accuracy of the assembly is improved. As a result, the valve plug 24 can be disposed in the same position at all times with respect to the retaining section 62 of the movable iron core 56. Owing thereto, the valve plug 24 is capable of being reliably seated on the valve seat 30 of the valve body 16. Stated otherwise, the reliability with which the valve plug 24 can be seated on the valve seat 30 of the valve body 16 can be improved. Further, together therewith, by seating the valve plug 24 onto the valve seat 30 and separating the valve plug 24 away from the valve seat 30, the communication state of the first and second ports 12, 14 can be reliably switched.

The solenoid valve according to the present invention is not limited to the above-described embodiment, and various other structures may be adopted as a matter of course, which do not deviate from the essential nature and gist of the present invention.

What is claimed is:

1. A solenoid valve having a predetermined regulated opening amount, comprising:
    a valve seat separating first and second communication passages;
    a solenoid comprising a bobbin, a coil wound around the bobbin, a fixed core and a movable iron core;
    a valve member mounted to one end of said movable iron core;
    a spring biasing the movable iron core such that the valve member is in engagement with the valve seat to close the valve when the coil is not energized;
    a one piece resin body disposed on said movable iron core, said one piece resin body having
    a guide member disposed at an outer circumferential surface of said movable iron core for guiding said movable iron core during movement of said movable iron core to open the valve when the coil is energized, and
    a stopper located adjacent said one end of said movable iron core for regulating the movement of said movable iron core by a predetermined distance.

2. The solenoid valve according to claim 1, wherein said valve member is formed from an elastic material and is molded integrally with respect to a recessed portion formed in said movable iron core.

3. The solenoid valve according to claim 1, wherein, when said movable iron core is displaced along the axial direction, said guide member is displaced while in sliding contact with a cylindrical sleeve disposed on an outer circumferential side of said movable iron core.

4. The solenoid valve according to claim 2, wherein said stopper regulates displacement in a valve open state, in which said valve member is separated from the valve seat.

5. A solenoid valve having a predetermined regulated opening amount, comprising:
    a valve seat separating first and second communication passages;
    a solenoid comprising a bobbin, a coil wound around the bobbin, a fixed core and a movable iron core;
    a valve member formed from an elastic material and molded integrally with respect to a recessed portion formed in said movable iron core;
    a spring biasing the movable iron core such that the valve member is in engagement with the valve seat to close the valve when the coil is not energized;
    a one piece resin body disposed on said movable iron core, said one piece resin body having
    a guide member disposed at an outer circumferential surface of said movable iron core for guiding said movable iron core during movement of said movable iron core to open the valve when the coil is energized, and
    a stopper located adjacent said one end of said movable iron core for regulating the movement of said movable iron core by a predetermined distance,
    wherein said guide member is constructed from a pair of annular members formed in a ring shape, and a connecting member extending along an axial direction of said cylindrical body and connecting one of the annular members to the other of the annular members, said annular members and said connecting member being inserted respectively into grooves that are formed on an outer circumferential surface of said movable iron core.

6. The solenoid valve according to claim 5, further comprising a plurality of said connecting members separated by substantially equal intervals along a circumferential direction of said guide member.

7. The solenoid valve according to claim 5, said grooves comprising:
    annular grooves into which said annular members are installed; and
    connecting grooves into which said connecting members are installed,
    wherein a depth dimension of said grooves is set to be smaller than a thickness dimension of said annular members and said connecting members.

8. The solenoid valve according to claim 5, wherein said recessed portion is formed in a tapered shape, which expands gradually in diameter in a direction separating away from the one end of said movable iron core.

* * * * *